(12) United States Patent
Wagner et al.

(10) Patent No.: US 12,313,483 B2
(45) Date of Patent: May 27, 2025

(54) SENSOR HAVING A PLURALITY OF DIAPHRAGMS

(71) Applicant: TE Connectivity Solutions GmbH, Schaffhausen (CH)

(72) Inventors: Dave Eric Wagner, Fremont, CA (US); Vincent Wong, Fremont, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 248 days.

(21) Appl. No.: 18/193,731

(22) Filed: Mar. 31, 2023

(65) Prior Publication Data

US 2024/0328882 A1 Oct. 3, 2024

(51) Int. Cl.
*G01L 13/02* (2006.01)
*G01L 7/08* (2006.01)

(52) U.S. Cl.
CPC ............ *G01L 13/026* (2013.01); *G01L 7/084* (2013.01)

(58) Field of Classification Search
CPC ... G01L 19/0645; G01L 19/147; G01L 7/084; G01L 9/0055; G01L 9/0042; G01L 9/0075; G01L 7/00; G01L 19/0084; G01L 9/0072; G01L 7/082; G01L 9/0073; G01L 19/0038; G01L 9/0054; G01L 13/025; G01L 19/0023; G01L 19/148; G01L 19/0046; G01L 19/0627; G01L 9/0051; G01L 19/0007; G01L 19/04; G01L 19/14; G01L 119/003; G01L 19/0636; G01L 7/08; G01L 19/0618; G01L 9/0044; G01L 19/143; G01L 19/0672; G01L 9/0077; G01L 15/00; G01L 9/0047; G01L 19/0069; G01L 19/0609; G01L 23/18; G01L 9/008; G01L 9/0048; G01L 9/0052; G01L 9/06; G01L 19/0092; G01L 19/0681; G01L 9/065; G01L 9/006; G01L 19/146; G01L 19/142; G01L 9/0064; G01L 9/125; G01L 9/045; G01L 13/026; G01L 17/00; G01L 19/02; G01L 23/10; G01L 7/088; G01L 19/0654;
(Continued)

(56) References Cited

U.S. PATENT DOCUMENTS 4,909,083 A * 3/1990 Fazeli ................... G01L 15/00
73/706
6,038,927 A * 3/2000 Karas ................... G01L 19/147
73/706
(Continued)

FOREIGN PATENT DOCUMENTS

CN 112649141 A * 4/2021 ........... G01L 13/025

*Primary Examiner* — Andre J Allen

(57) ABSTRACT

A sensor includes a housing having a body, a plurality of ports, and a plurality of cavities. The ports include a first port and a second port, and the cavities include a first cavity disposed in the first port and a second cavity disposed in the second port. The sensor includes a first diaphragm disposed in the first port and enclosing the first cavity and a second diaphragm disposed in the second port and enclosing the second cavity. The first diaphragm and the second diaphragm are coplanar with one another in a first plane. The sensor includes a die disposed in the first cavity and having a membrane that is deflectable according to a differential pressure between a first pressure in the first cavity and a second pressure in the second cavity. The die is attached to the housing along a second plane parallel to the first plane.

20 Claims, 6 Drawing Sheets

(58) Field of Classification Search
CPC ......... G01L 11/00; G01L 19/08; G01L 19/12; G01L 11/006; G01L 19/145; G01L 7/086; G01L 9/0025; G01L 9/0076; G01L 9/0022; G01L 19/069; G01L 19/141; G01L 9/007; G01L 9/0079; G01L 9/12; G01L 19/0061; G01L 19/10; G01L 27/007; G01L 19/0076; G01L 19/06; G01L 19/0663; G01L 23/16; G01L 9/0041; G01L 9/0045; G01L 9/08; G01L 9/14; G01L 13/00; G01L 7/043; G01L 9/007; G01L 19/086; G01L 19/149; G01L 23/08; G01L 7/02; G01L 7/022; G01L 7/04; G01L 7/18; G01L 9/0016; G01L 1/02; G01L 11/02; G01L 13/02; G01L 19/0015; G01L 23/221; G01L 9/0039; G01L 9/0058; G01L 9/0089; G01L 1/005; G01L 1/142; G01L 1/162; G01L 11/002; G01L 11/025; G01L 19/144; G01L 21/00; G01L 23/22; G01L 23/222; G01L 27/00; G01L 27/002; G01L 7/024; G01L 7/063; G01L 7/102; G01L 7/166; G01L 9/0027; G01L 9/025; G01L 1/14; G01L 1/16; G01L 1/18; G01L 1/20; G01L 1/2262; G01L 11/008; G01L 11/04; G01L 19/00; G01L 21/22; G01L 23/12; G01L 27/005; G01L 3/245; G01L 5/226; G01L 7/048; G01L 7/10; G01L 7/104; G01L 7/187; G01L 9/0005; G01L 9/0019; G01L 9/0026; G01L 9/0033; G01L 9/0057; G01L 9/0082; G01L 9/0092; G01L 9/04; G01L 1/04; G01L 1/046; G01L 1/127; G01L 1/146; G01L 1/148; G01L 1/165; G01L 1/205; G01L 1/22; G01L 1/2231; G01L 1/2281; G01L 1/2293; G01L 1/246; G01L 11/004; G01L 13/028; G01L 13/06; G01L 19/16; G01L 21/02; G01L 21/10; G01L 21/12; G01L 21/30; G01L 21/32; G01L 23/02; G01L 23/14; G01L 23/24; G01L 23/28; G01L 23/32; G01L 25/00; G01L 3/10; G01L 5/0028; G01L 5/0061; G01L 5/0076; G01L 5/10; G01L 5/102; G01L 5/108; G01L 5/14; G01L 5/165; G01L 5/22; G01L 5/223; G01L 5/228; G01L 7/041; G01L 7/045; G01L 7/061; G01L 7/068; G01L 7/12; G01L 7/16; G01L 7/22; G01L 9/00; G01L 9/0001; G01L 9/0002; G01L 9/0004; G01L 9/001; G01L 9/0013; G01L 9/0017; G01L 9/002; G01L 9/0036; G01L 9/0083; G01L 9/0085; G01L 9/0086; G01L 9/0088; G01L 9/0098; G01L 9/10
USPC .................................................. 73/700–756
See application file for complete search history.

(56) References Cited

U.S. PATENT DOCUMENTS

| | | | |
|---|---|---|---|
| 7,578,194 B1 * | 8/2009 | Hadjiloucas | G01L 13/025 73/736 |
| 9,562,796 B2 | 2/2017 | Lull | |
| 11,015,994 B2 * | 5/2021 | Sanden | G01L 19/0076 |
| 11,073,846 B2 | 7/2021 | Lull et al. | |
| 2023/0228639 A1 * | 7/2023 | Tsuji | H01L 29/84 73/724 |
| 2024/0302236 A1 * | 9/2024 | Wagner | G01L 9/06 |
| 2024/0337551 A1 * | 10/2024 | Wagner | G01L 19/0038 |

* cited by examiner

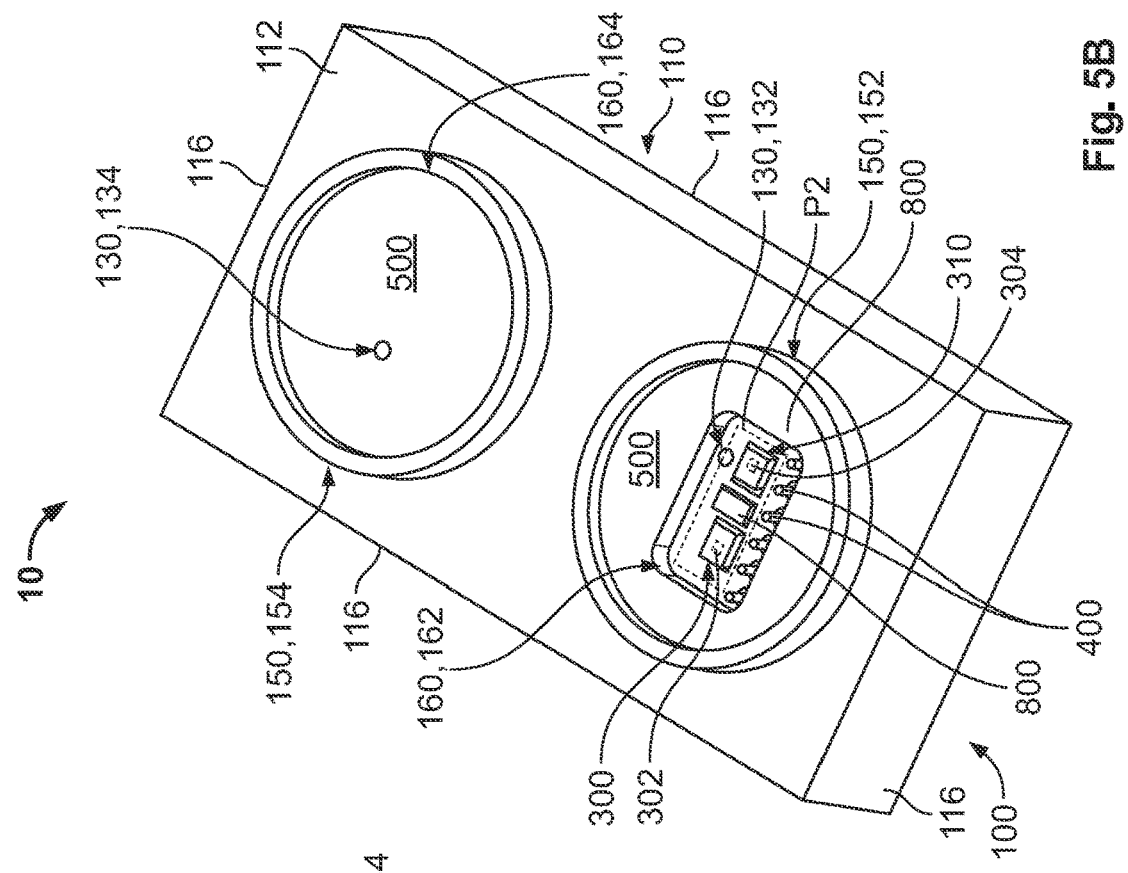
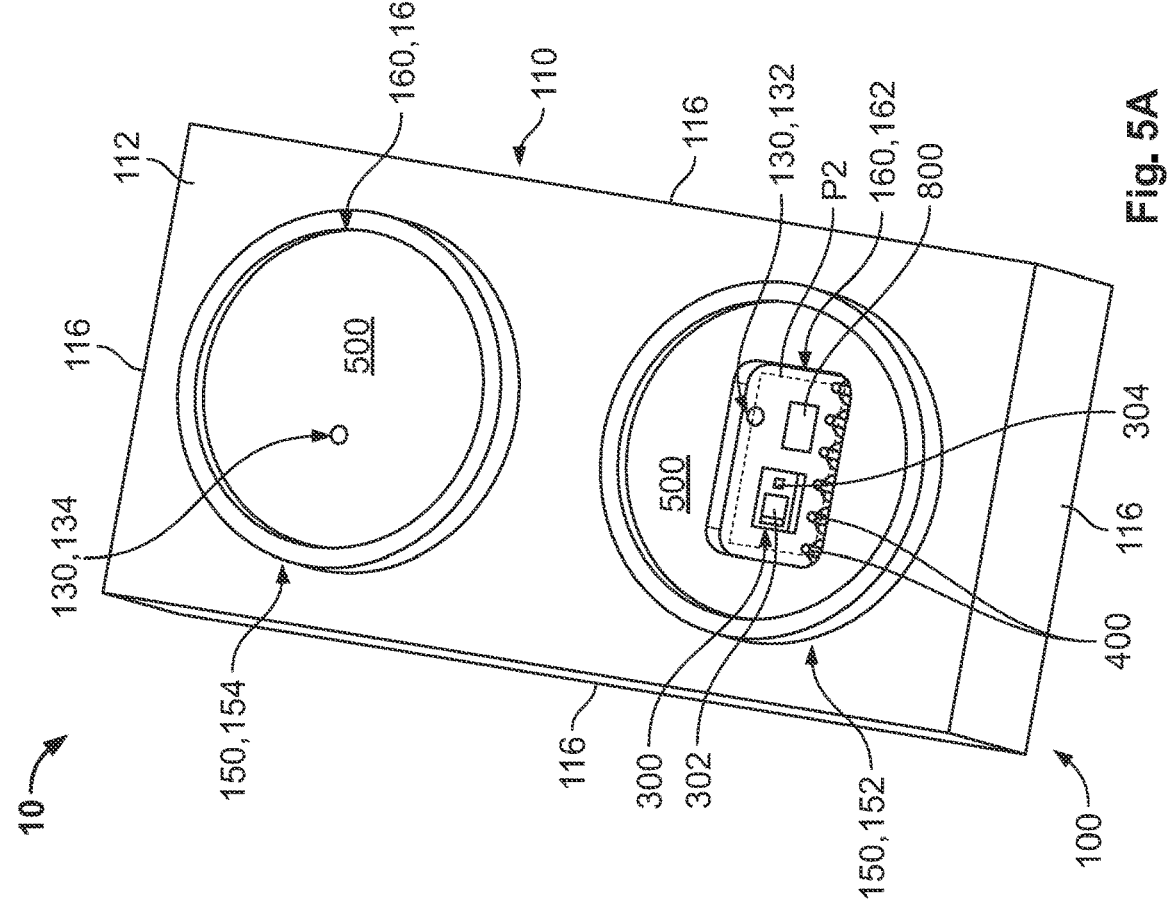

SENSOR HAVING A PLURALITY OF DIAPHRAGMS

FIELD OF THE INVENTION

The present invention relates to a sensor and, more particularly, to a sensor having a plurality of diaphragms.

BACKGROUND

A pressure sensor commonly has a housing and a diaphragm attached to the housing. An oil is disposed within passageways of the housing and a sensing die is disposed in the housing within the oil. When an external pressure is applied to the diaphragm, the diaphragm deflects, transferring the external pressure to the oil surrounding the die, which imparts the same external pressure to the die. The die deflects in accordance with the external pressure to generate an electrical signal representative of the external pressure.

This type of pressure sensor commonly has two diaphragms to transmit two external pressures to the die, allowing the die to measure a differential pressure between the two external pressures. The two diaphragms are often axially opposed to one another, however, which requires extensive passageways to be formed in the housing to transmit the appropriate pressures to the die. Positioning the diaphragms in an axially opposed arrangement is also difficult and time consuming for the manufacturer.

SUMMARY

A sensor includes a housing having a body, a plurality of ports, and a plurality of cavities. The ports include a first port and a second port, and the cavities include a first cavity disposed in the first port and a second cavity disposed in the second port. The sensor includes a first diaphragm disposed in the first port and enclosing the first cavity and a second diaphragm disposed in the second port and enclosing the second cavity. The first diaphragm and the second diaphragm are coplanar with one another in a first plane. The sensor includes a die disposed in the first cavity and having a membrane that is deflectable according to a differential pressure between a first pressure in the first cavity and a second pressure in the second cavity. The die is attached to the housing along a second plane parallel to the first plane.

BRIEF DESCRIPTION OF THE DRAWINGS

The invention will now be described by way of example with reference to the accompanying Figures, of which:

FIG. 5A is a perspective view of a sensor according to another embodiment;

FIG. 5B is a perspective view of a sensor according to another embodiment; and

DETAILED DESCRIPTION OF THE EMBODIMENT(S)

Figure 1:
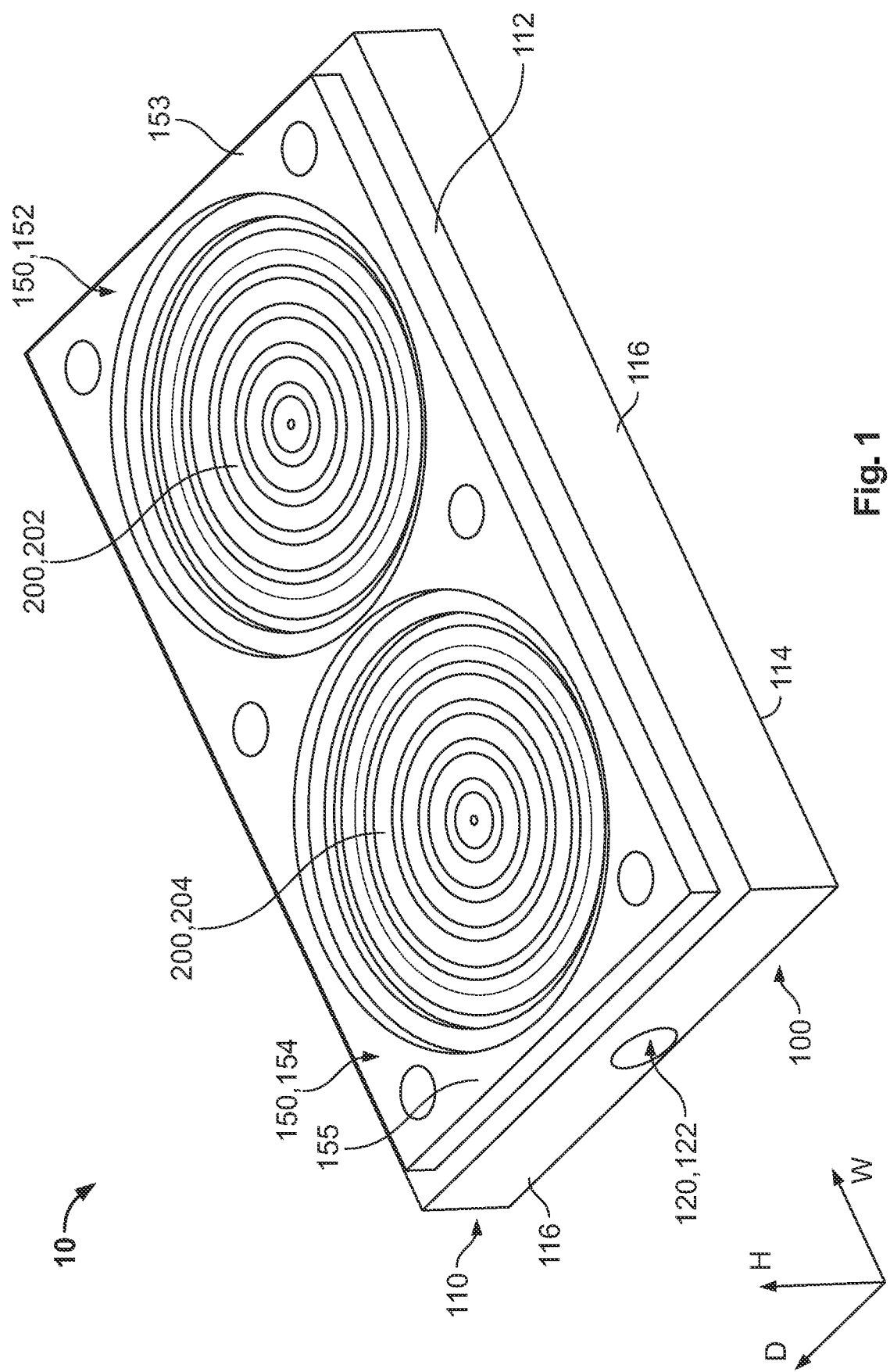
FIG. 1 is a perspective view of a sensor according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "height direction", "depth direction", and "width direction". These descriptors are merely for clarity of the description and for differentiation of the various directions. These directional descriptors do not imply or require any particular orientation of the disclosed elements.

Figure 2:
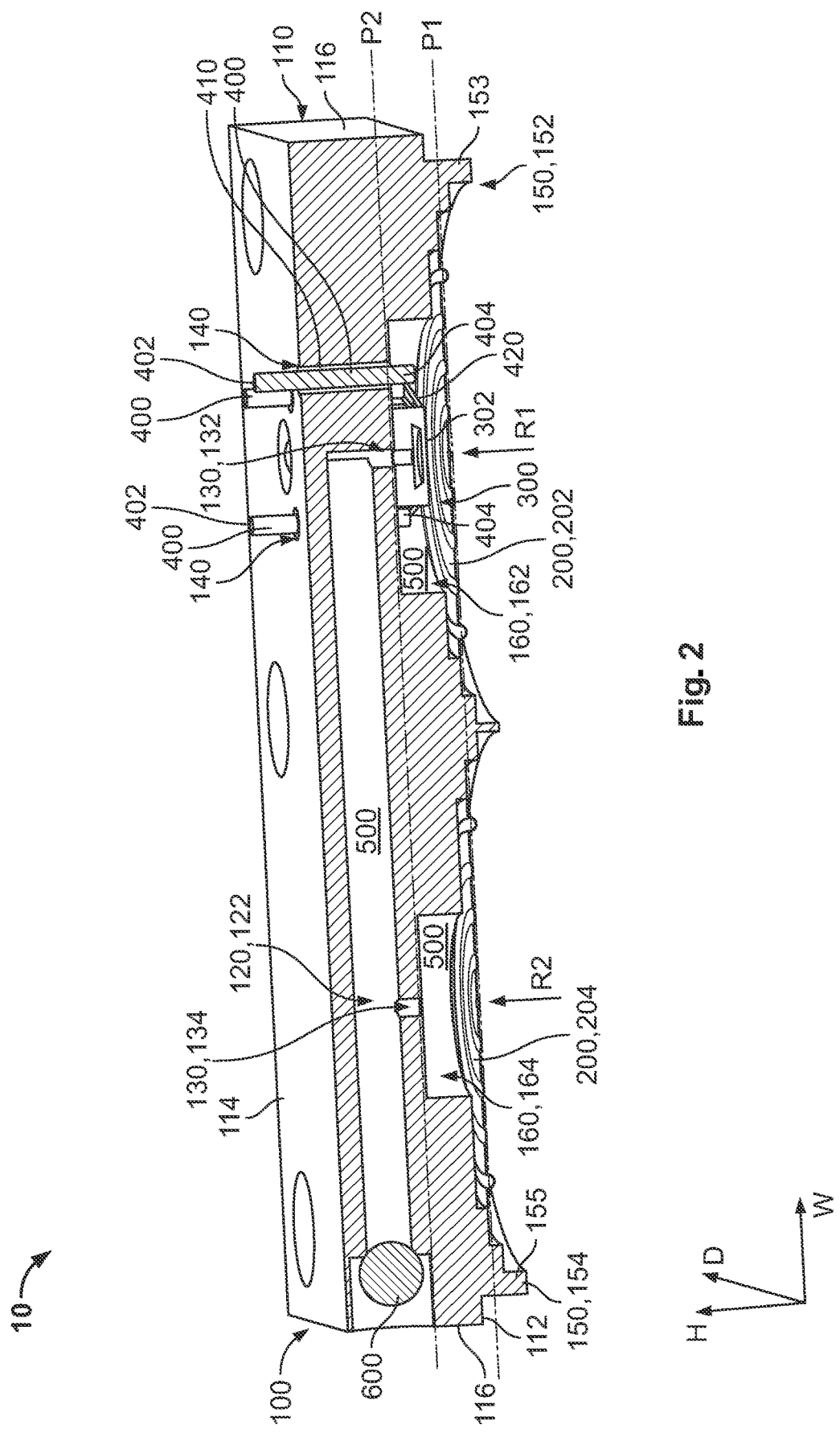
FIG. 2 is a sectional perspective view of the sensor of FIG. 1.

A sensor 10 according to an embodiment shown in FIGS. 1 and 2 includes a housing 100, a plurality of diaphragms 200 disposed in the housing 100, a die 300 disposed in the housing 100, and a plurality of pins 400 extending through the housing 100.

The housing 100 includes a body 110, as shown in FIGS. 1 and 2, having a first face 112 and a second face 114 opposite the first face 112 in a height direction H. The body 110 has a plurality of sidewalls 116 connecting the first face 112 and the second face 114. In the shown embodiment, the sidewalls 116 form an approximately rectangular shape of the body 110. In other embodiments, the body 110 could have a different polygonal shape formed by the sidewalls 116.

As shown in FIG. 2, the housing 100 has a plurality of passageways 120 extending through the body 110. The passageways 120 include a main passageway 122 extending in a width direction W perpendicular to the height direction H through one of the sidewalls 116. The main passageway 122 extends partially through the body 110.

The passageways 120 include a plurality of cavity passageways 130, shown in FIG. 2, extending from the main passageway 122. In the shown embodiment, the cavity passageways 130 extend in the height direction H perpendicular to the main passageway 122. The cavity passageways 130, in the embodiment shown in FIG. 2, include a first cavity passageway 132 extending from an end of the main passageway 122 opposite the sidewall 116 through which the main passageway 122 enters and a second passageway 134 extending from the main passageway 122 between the first cavity passageway 132 and the sidewall 116 through which the main passageway 122 enters.

As shown in FIG. 2, the passageways 120 include a plurality of pin passageways 140 extending through the body 110. The pin passageways 140 extend through the second face 114 in the height direction H. The pin passageways 140, in the shown embodiment, are positioned adjacent to an end of the main passageway 122 and do not intersect with the main passageway 122.

As shown in FIGS. 1 and 2, the housing 100 has a plurality of ports 150 extending from the body 110. The ports 150, in the shown embodiment, include a first port 152 having a first wall 153 extending from the first face 112 of the body 110 in the height direction H and a second port 154 having a second wall 155 extending from the first face 112 of the body 110 in the height direction H. In the shown embodiment, the first wall 153 and the second wall 155 are coextensive and formed in a single wall between the first port 152 and the second port 154 in the width direction W. In another embodiment, shown for example in FIG. 3, the first wall 153 and the second wall 155 could be separated from one another along the width direction W to define discrete ports 152, 154 protruding from the body 110.

The housing 100 has a plurality of cavities 160. In the embodiment shown in FIG. 2, the cavities 160 include a first cavity 162 disposed in the first port 152 and a second cavity 164 disposed in the second port 154. The cavities 160 are openings in the housing 100 that extend into the body 110. The first cavity passageway 132 connects the main passageway 122 to the first cavity 162 and the second cavity passageway 134 connects the main passageway 122 to the second cavity 164. The pin passageways 140 in the shown embodiment extend from the second face 114 of the body 110 in the height direction H into the first cavity 162.

In the shown embodiment, the housing 100 is monolithically formed in a single piece from a metal material. In another embodiment, the housing 100 can be formed from a plurality of pieces and assembled together to form the elements of the housing 100 described above. In other embodiments, the housing 100 may be formed of conductive materials other than metal, or may be formed of a non-conductive material.

As shown in FIGS. 1 and 2, the diaphragms 200 are disposed in the ports 150 of the housing 100. The diaphragms 200 are each formed of a resiliently flexible material. The resiliently flexible material of the diaphragms 200 may be a thin metal material, such as stainless steel, or may be other conductive or non-conductive flexible materials capable of transmitting force as described in greater detail below. The diaphragms 200 may be planar elements or, as in the shown embodiment, may have a corrugated cross-sectional shape.

In the embodiment shown in FIGS. 1 and 2, the diaphragms 200 include a first diaphragm 202 disposed in the first port 152 and a second diaphragm 204 disposed in the second port 154. The first diaphragm 202 is attached to the first wall 153 of the first port 152 and encloses first cavity 162. The second diaphragm 204 is attached to the second wall 155 of the second port 154 and encloses the second cavity 164. The diaphragms 202, 204 may be attached to the walls 153, 155 by welding or by any other form of attachment. As shown in FIG. 2, the first diaphragm 202 and the second diaphragm 204 are coplanar with one another in a first plane P1.

The die 300, as shown in FIG. 2, is disposed in the first cavity 162 and attached to the body 110 of the housing 100. The die 300 is a MEMS pressure sensor and has a first membrane 302 in the shown embodiment that is resiliently deflectable in accordance with pressures on opposite sides of the first membrane 302. The die 300 is attached to the housing 100 along a second plane P2 that is parallel to the first plane P1.

As shown in FIG. 2, the pins 400 are each disposed in one of the pin passageways 140 and each extend from a first end 402 outside the housing 100 to an opposite second end 404 disposed in the first cavity 162. The pins 400 are formed from an electrically conductive material, such as a metal alloy with nickel and/or gold. The second end 404 of each of the pins 400 is electrically connected to the die 300 in the first cavity 162 by a wirebond 420.

The pins 400, as shown in FIG. 2, each have a pin seal 410 disposed around the pins 400 in the pin passageways 140. The pin seal 410 hermetically seals the pins 400 in the pin passageways 140 to the housing 100. The pin seal 410, in an embodiment, is a glass material that forms a glass-to-metal bond with the housing 100 and the pins 400.

The sensor 10 is filled with an oil 500 in the main passageway 122, the cavity passageways 130, and the cavities 160. The oil 500 is held in the cavities 160 by the diaphragms 200 attached to the ports 150. Once the oil 500 has been filled in the main passageway 122, the cavity passageways 130, and the cavities 160, a passageway seal 600 is positioned in an end of the main passageway 122 adjacent to the sidewall 116 to retain and seal the oil 500 in the sensor 10, as shown in FIG. 2. The passageway seal 600, in an embodiment, is a glass material that forms a glass-to-metal bond with the housing 100. In other embodiments, a different non-compressible liquid may be used in place of the oil 500.

During use of the sensor 10 to measure pressure, the sensor 10 is exposed to, for example, a first pressure R1 and a second pressure R2. The first pressure R1 acts on the first diaphragm 202 in the first port 152. The first diaphragm 202 deflects in proportion with the first pressure R1 and correspondingly transmits the first pressure R1 to the oil 500 in the first cavity 162. The oil 500 in the first cavity 162 imparts the first pressure R1 on a first side of the first membrane 302 of the die 300. The second pressure R2 acts on the second diaphragm 204 in the second port 154. The second diaphragm 204 deflects in proportion with the second pressure R2 and correspondingly transmits the second pressure R2 to the oil 500 in the second cavity 164. The oil 500 in the second cavity 164 is connected to the main passageway 122 and the cavity passageways 130; the oil 500 in each of these areas 122, 130, 164 is subject to the second pressure R2 by deflection of the second diaphragm 204. The oil 500 in the first cavity passageway 132 imparts the second pressure R2 on the second side of the first membrane 302 of the die 300.

The first membrane 302, in the embodiment shown in FIG. 2, deflects according to a differential pressure between the first pressure R1 in the first cavity 162 and the second pressure R2 in the second cavity 164. Deflection of the first membrane 302 generates an electrical signal representative of the differential pressure on the opposite sides of the first membrane 302. The electrical signal can be output external from the sensor 10 though the pins 400 connected to the die 300.

Figure 3:
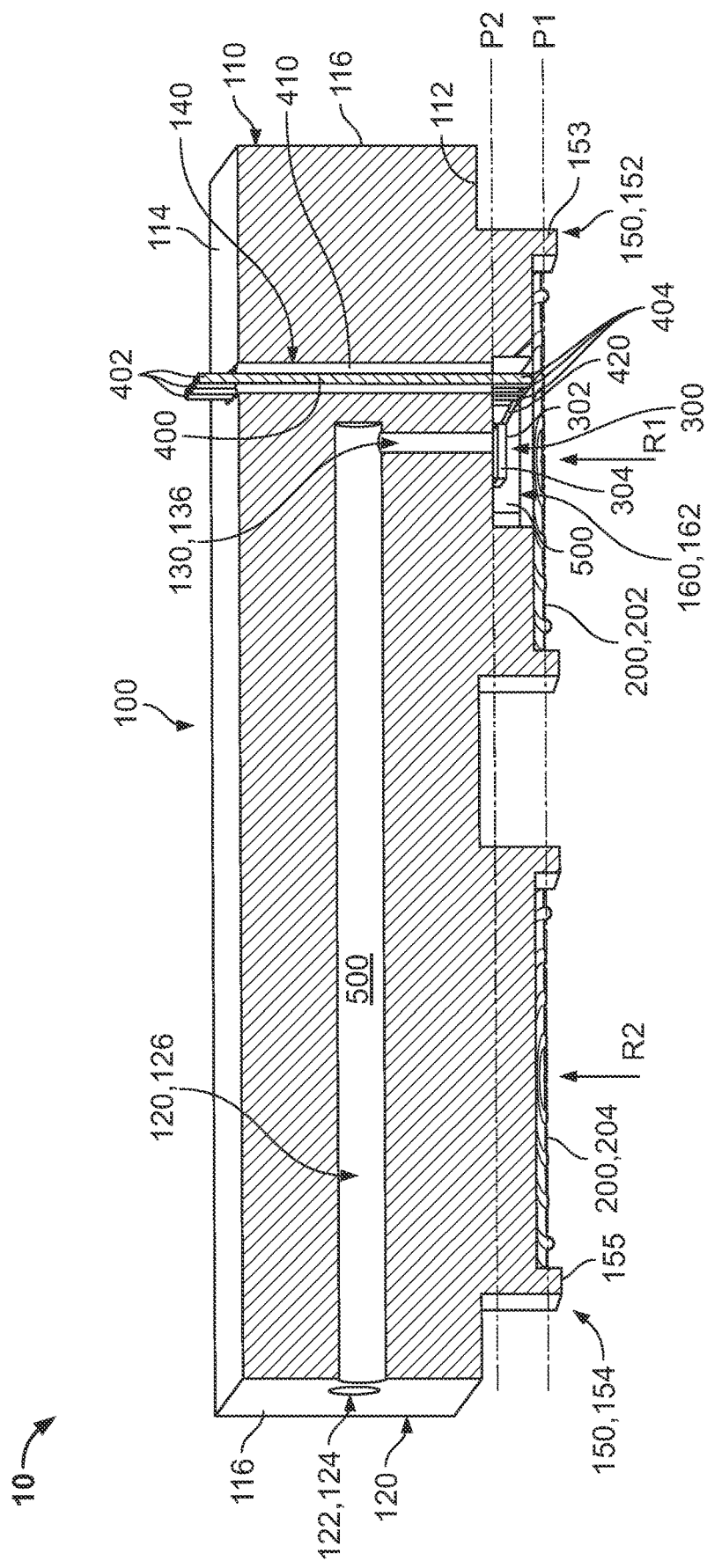
FIG. 3 is a sectional perspective view of a sensor according to another embodiment.
Figure 4:
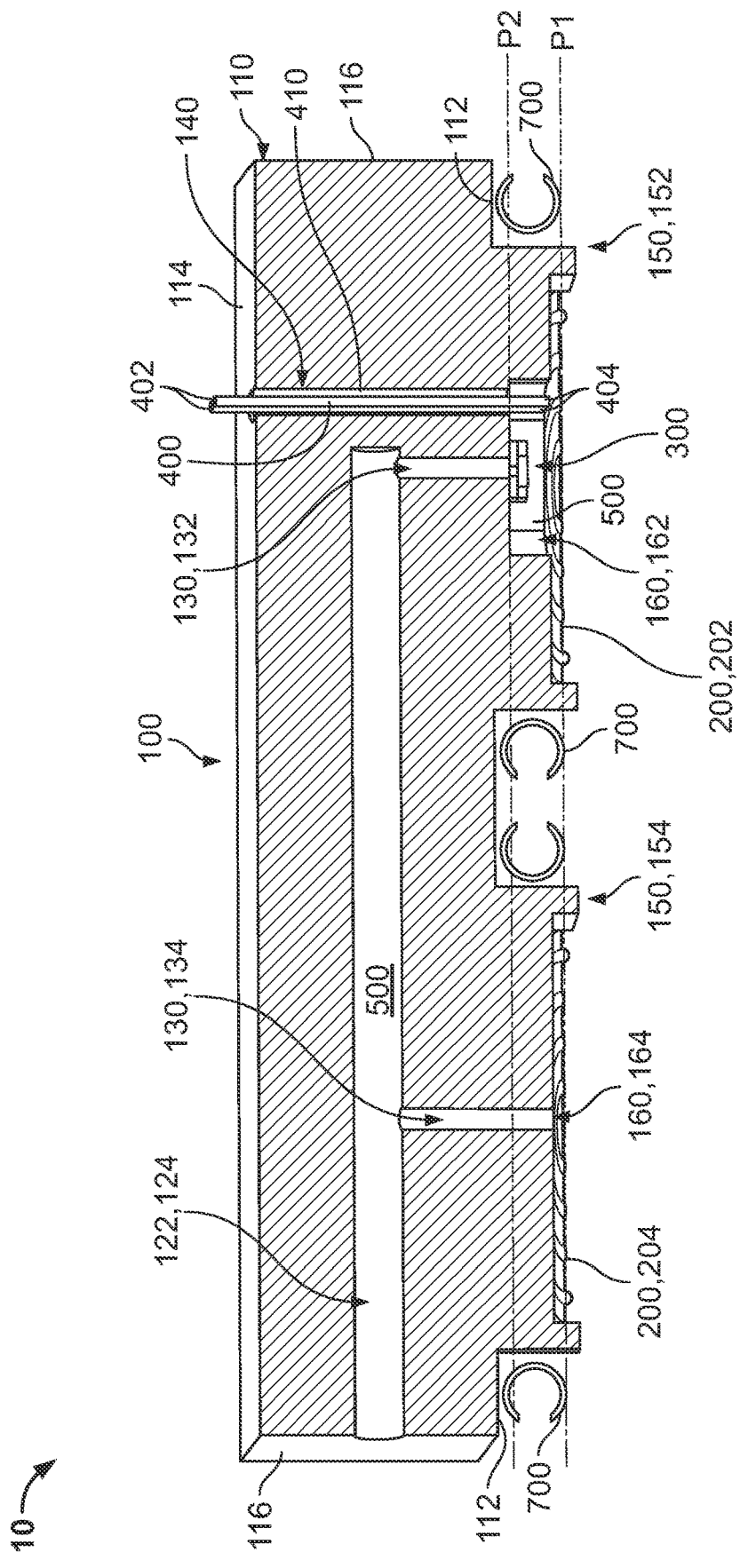
FIG. 4 is a sectional perspective view of a sensor according to another embodiment.

A sensor 10 according to another embodiment is shown in FIGS. 3 and 4. Like reference numbers refer to like elements and primarily the differences from the embodiment of the sensor 10 shown in FIGS. 1 and 2 will be described in detail herein.

In the embodiment shown in FIGS. 3 and 4, the housing 100 has a pair of main passageways 122 including a first main passageway 124 and a second main passageway 126. The first main passageway 124 and the second main passageway 126 each extend through a same one of the sidewalls 116 of the body 110 in the width direction W and extend partially through the body 110. The first main passageway 124 and the second main passageway 126 do not communicate with one another; the main passageways 124, 126 are separated along a depth direction D perpendicular to the width direction W and the height direction H.

As shown in FIG. 4, the first cavity passageway 132 connects the first main passageway 124 to the first cavity 162 and the second cavity passageway 134 connects the first main passageway 124 to the second cavity 164. As shown in FIG. 3, a supplemental cavity passageway 136 extends in the height direction H perpendicular to the second main passageway 126 and connects the second main passageway 126 to the first cavity 162.

The presence of both the first main passageway 124 and the second main passageway 126 in the housing 100 eases the process of filling the main passageways 122, the cavity passageway 130, and the cavities 160 with the oil 500. Each of the first main passageway 124 and the second main passageway 126 can be sealed by the passageway seal 600 shown in FIGS. 1 and 2 and described in detail above.

As shown in the embodiment of FIG. 3, the die 300 of the sensor 10 can have a second membrane 304 in addition to the first membrane 302. The second membrane 304 is subject to the first pressure R1 in the first cavity 162 but has a vacuum or predetermined pressure acting on the opposite side of the second membrane 304, such that the second membrane 304 deflects according to an absolute measurement of the first pressure R1 in the first cavity 162. In the embodiment shown in FIG. 3, the second membrane 304 is monolithically formed in a single piece with the first membrane 302.

In the embodiment shown in FIG. 4, the sensor 10 has a housing seal 700 disposed on the first face 112 of the body 110 around and between the first port 152 and the second port 154. The housing seal 700 can compress and seal the first port 152 and the second port 154 when the sensor 10 is attached to an external object at the ports 150, such as a manifold. The housing seal 700 is elastically compressible and may be an elastomeric material, such as an O-ring, or may be a metal material, such as a W-ring, a C-ring, an E-ring, or any type of sealing element that can form a hermetic seal with a machined surface. The orientation of the housing seal 700 shown in FIG. 4 is merely exemplary and other orientations are possible depending on the application. In another embodiment, the housing seal 700 can be omitted, and the first port 152 and the second port 154 can be welded, such as by resistance welding or other types of welding, to the external object.

Sensors 10 according to other embodiments are shown in FIGS. 5A and 5B. Like reference numbers refer to like elements and primarily the differences from the embodiment of the sensor 10 shown in FIGS. 1 and 2 will be described in detail herein. The sensors 10 of FIGS. 5A and 5B are shown without the diaphragms 200 for ease of explanation, but the sensors 10 in the shown embodiments nonetheless have the diaphragms 200, which function as described above.

In the embodiment of FIG. 5A, the sensor 10 has an integrated circuit 800, such as an application-specific integrated circuit (ASIC), disposed in the first cavity 162 and electrically connected to the die 300. The integrated circuit 800 is attached to the housing 100 along the same second plane P2 as the die 300. The die 300 in the shown embodiment has the first membrane 302 and the second membrane 304 monolithically formed with the first membrane 302, but could alternatively have just the first membrane 302 measuring the differential pressure or be any other embodiment of a die 300 described herein. The integrated circuit 800 processes the electrical signal output from the die 300 to determine the differential and/or absolute pressure sensed by the die 300. Positioning the integrated circuit 800 in the oil 500 in close proximity with the die 300 improves signal processing and eases manufacturing of the sensor 10.

In the embodiment of FIG. 5B, in addition to the die 300 and the integrated circuit 800 disposed in the first cavity 162, the sensor 10 also has a second die 310 disposed in the first cavity 162 and electrically connected to the integrated circuit 800. In this embodiment, the die 300 is a first die 300 with the first membrane 302 that measures a differential pressure between the first cavity 162 and the second cavity 164. The second die 310 has the second membrane 304 separate from the first die 300 and measures an absolute pressure in the first cavity 162. The second die 310 is attached to the housing 100 along the same second plane P2 as the first die 300 and the integrated circuit 800.

Figure 6:
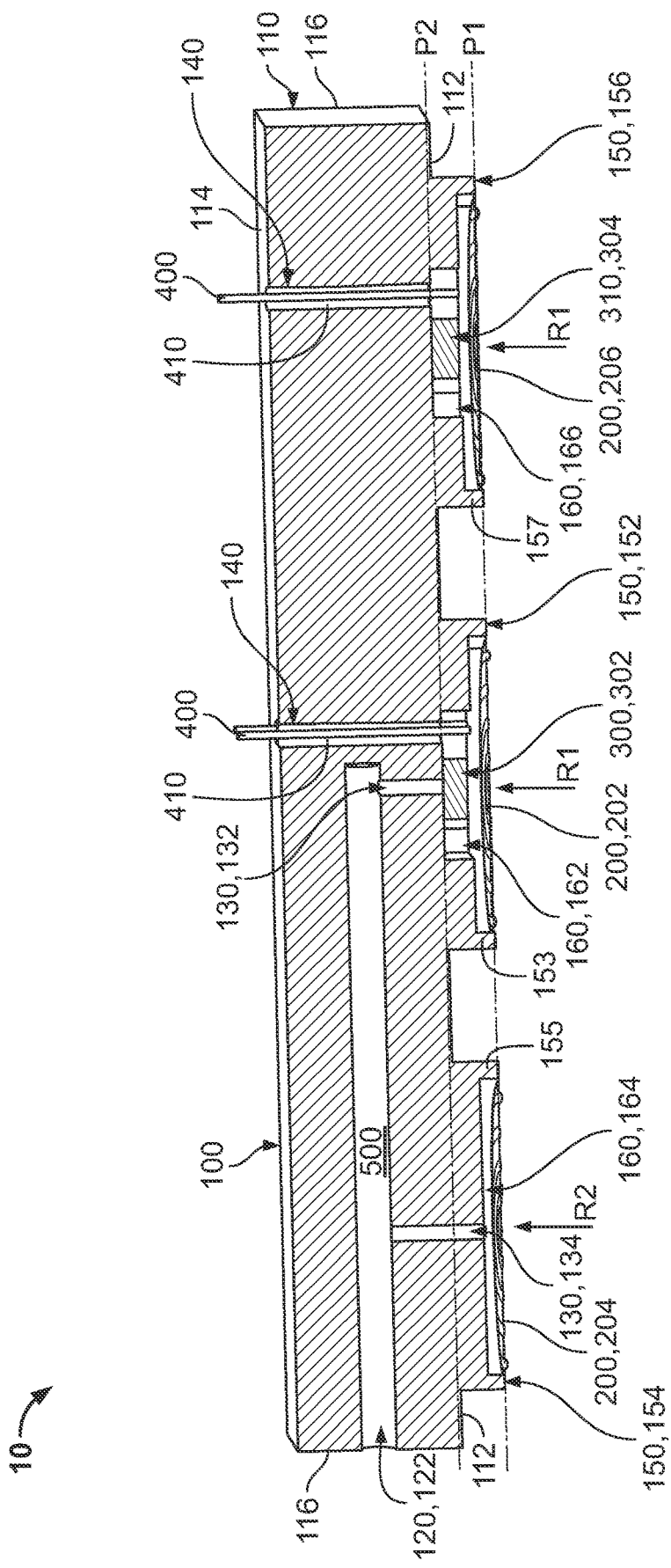
FIG. 6 is a sectional perspective view of a sensor according to another embodiment.

A sensor 10 according to another embodiment is shown in FIG. 6. Like reference numbers refer to like elements and primarily the differences from the embodiment of the sensor 10 shown in FIGS. 1 and 2 will be described in detail herein.

In the sensor 10 according to the embodiment of FIG. 6, the ports 150 include a third port 156 extending from the body 110 and the cavities 160 include a third cavity 166 disposed in the third port 156. The third port 156 has a third wall 157 extending from the first face 112 of the body 110 in the height direction H. The diaphragms 200 include a third diaphragm 206 disposed in the third port 156. The third diaphragm 206 is attached to the third wall 157 of the third port 156, for example by welding, and encloses the third cavity 166. The third diaphragm 206 is coplanar with the first diaphragm 202 and the second diaphragm 204 in the first plane P1.

As shown in FIG. 6, the first die 300 disposed in the first cavity 162 has the first membrane 302 that is deflectable in accordance with a differential pressure between the first pressure R1 and the second pressure R2, as described above. The sensor 10 includes the second die 310 disposed in the third cavity 166 and attached to the body 110 of the housing 100. The second die 310 is attached to the housing 100 along the same second plane P2 as the first die 300.

The second die 310, as shown in FIG. 6, is only exposed to the third cavity 166 and does not have a passageway 120 extending to a side of the second die 310. In the shown embodiment, the second membrane 304 of the second die 310 deflects in accordance with an absolute measurement of the first pressure R1 in the third cavity 166. The first die 300 and the second die 310 can output a generated pressure signal along the pins 400, as described in detail above.

In the sensor 10 according to the various embodiments described above, positioning the diaphragms 200 to be coplanar with one another in the first plane P1, and parallel to a second plane P2 of the die 300, improves the manufacturability of the sensor 10. The arrangement of the diaphragms 200 and the die 300 also permits the passageways 120 to be less extensive within the housing 100, further improving manufacturability. The ports 150 according to the various embodiments and various dies 300, 310 used in the embodiments allow for a range of possible differential, absolute, or combined differential and absolute measurements in this arrangement, while positioning the integrated circuit 800 in the ports 150 can further improve signal processing and use of the sensor 10.

What is claimed is:

1. A sensor, comprising:
    a housing having a body, a plurality of ports extending from the body, and a plurality of cavities disposed in the housing, the ports include a first port and a second port, the cavities include a first cavity disposed in the first port and a second cavity disposed in the second port;
    a plurality of diaphragms including a first diaphragm disposed in the first port and enclosing the first cavity and a second diaphragm disposed in the second port and enclosing the second cavity, the first diaphragm and the second diaphragm are coplanar with one another in a first plane; and a die disposed in the first cavity and having a membrane that is deflectable according to a differential pressure between a first pressure in the first cavity and a second pressure in the second cavity, the die is attached to the housing along a second plane parallel to the first plane.

2. The sensor of claim 1, wherein the body has a first face, a second face opposite the first face, and a plurality of sidewalls connecting the first face and the second face, the ports extend from the first face.

3. The sensor of claim 2, wherein the body has a plurality of passageways extending through the body, the passageways include a main passageway extending through one of the sidewalls.

4. The sensor of claim 3, wherein the passageways include a plurality of cavity passageways extending from the main passageway, the cavity passageways include a first cavity passageway connecting the main passageway to the first cavity and a second cavity passageway connecting the main passageway to the second cavity.

5. The sensor of claim 4, wherein the main passageway, the cavity passageways, and the cavities are filled with an oil.

6. The sensor of claim 3, wherein the housing has a passageway seal sealing an end of the main passageway at the one of the sidewalls.

7. The sensor of claim 4, wherein the main passageway is a first main passageway, and the passageways include a second main passageway extending through the one of the sidewalls.

8. The sensor of claim 7, wherein the passageways include a supplemental cavity passageway connecting the second main passageway with one of the first cavity and the second cavity.

9. The sensor of claim 3, wherein the passageways include a plurality of pin passageways extending through the body from the second face to the first cavity.

10. The sensor of claim 9, further comprising a plurality of pins disposed in the pin passageways, the pins each have a first end disposed outside of the housing and a second end disposed in the first cavity, the second ends of the pins are electrically connected to the die in the first cavity.

11. The sensor of claim 10, wherein the pins have a pin seal disposed around the pins in the pin passageways and hermetically sealing the pins to the housing.

12. The sensor of claim 1, wherein the membrane is a first membrane and the die has a second membrane deflectable according to an absolute measurement of the first pressure in the first cavity, the second membrane is monolithically formed in a single piece with the first membrane.

13. The sensor of claim 1, further comprising an integrated circuit disposed in the first cavity and electrically connected to the die.

14. The sensor of claim 1, wherein the die is a first die and the membrane is a first membrane, and further comprising a second die having a second membrane disposed in the first cavity, the second membrane is deflectable according to an absolute measurement of the first pressure in the first cavity, the second die is attached to the housing along the second plane.

15. The sensor of claim 2, further comprising a housing seal disposed around the ports on the first face of the body.

16. The sensor of claim 15, wherein the housing seal is an elastomeric material or a metal material.

17. The sensor of claim 1, wherein the ports include a third port and the cavities include a third cavity disposed in the third port.

18. The sensor of claim 17, wherein the diaphragms include a third diaphragm disposed in the third port and enclosing the third cavity, the third diaphragm is coplanar with the first diaphragm and the second diaphragm in the first plane.

19. The sensor of claim 18, wherein the die is a first die and the membrane is a first membrane, and further comprising a second die having a second membrane disposed in the third cavity.

20. The sensor of claim 19, wherein the second membrane is deflectable according to an absolute measurement of the first pressure in the third cavity, the second die is attached to the housing along the second plane.

* * * * *